US008346958B2

(12) United States Patent
Aschen et al.

(10) Patent No.: US 8,346,958 B2
(45) Date of Patent: Jan. 1, 2013

(54) RATE CONTROL TECHNIQUE FOR A LIGHTWEIGHT DIRECTORY ACCESS PROTOCOL OVER MQSERIES (LOM) SERVER

(75) Inventors: Sean E. Aschen, Torrington, CT (US); Bahri B. Bali, Cary, NC (US); Catherine Y. Barnes, Mansfield, PA (US); Gordan G. Greenlee, Endicott, NY (US); Dennis L. Hartel, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/328,424

(22) Filed: Dec. 4, 2008

(65) Prior Publication Data

US 2010/0146517 A1 Jun. 10, 2010

(51) Int. Cl.
 G06F 15/16 (2006.01)
 G06F 7/00 (2006.01)
 G06F 17/30 (2006.01)
(52) U.S. Cl. ........................................ 709/232; 707/769
(58) Field of Classification Search .................. 709/232; 707/769
 See application file for complete search history.

(56) References Cited

U.S. PATENT DOCUMENTS

| 6,304,906 | B1* | 10/2001 | Bhatti et al. ................... 709/227 |
| 6,779,058 | B2* | 8/2004 | Kishi et al. ....................... 710/60 |
| 2004/0230675 | A1* | 11/2004 | Freimuth et al. .............. 709/223 |
| 2006/0029016 | A1* | 2/2006 | Peles .............................. 370/328 |
| 2006/0224725 | A1* | 10/2006 | Bali et al. ....................... 709/224 |
| 2006/0259905 | A1* | 11/2006 | Diao et al. ..................... 718/100 |
| 2007/0013948 | A1 | 1/2007 | Bevan |
| 2007/0061864 | A1* | 3/2007 | Bali et al. ........................... 726/2 |
| 2007/0250631 | A1* | 10/2007 | Bali et al. ....................... 709/226 |
| 2007/0271570 | A1* | 11/2007 | Brown et al. .................. 718/105 |
| 2007/0294399 | A1* | 12/2007 | Grossner et al. .............. 709/224 |
| 2008/0010563 | A1* | 1/2008 | Nishimura ....................... 714/55 |
| 2008/0279189 | A1* | 11/2008 | Smith et al. .................... 370/394 |
| 2009/0113099 | A1* | 4/2009 | Shukla et al. ................. 710/241 |

* cited by examiner

*Primary Examiner* — George C Neurauter
(74) *Attorney, Agent, or Firm* — John Pivnichny; Roberts, Mlotkowski, Safran & Cole, P.C.

(57) ABSTRACT

A system and method for controlling rates for a Lightweight Directory Access Protocol (LDAP) over MQSeries (LoM) server. The system comprises a health metrics engine configured to calculate an actual delay value, at least one LoM server configured to asynchronously obtain the actual delay value from the health metrics engine and place the delay value between one or more requests, and a LDAP master configured to accept the one or more requests and send information in the one or more requests to a LDAP replica.

10 Claims, 7 Drawing Sheets

| v(k,i) | 1 | 2 | 3 | 4 | 5 | a | κ | L | η | δ | Δ | ρ | D | D*w |
|---|---|---|---|---|---|---|---|---|---|---|---|---|---|---|
| 1 | 900 | 1000 | 2000 | 1400 | 980 | 1256.000 | 0.256000 | 3 | 0.050000 | -420 | 0.000000 | 0.306000 | 653.000 | 13.060 |
| 2 | 150 | 90 | 120 | 100 | 70 | 106.000 | 0.000000 | 2 | 0.000000 | -30 | 0.000000 | 0.000000 | 500.000 | 10.000 |
| 3 | 1000 | 900 | 1100 | 600 | 750 | 870.000 | 0.000000 | 2 | 0.000000 | 150 | 0.250000 | 0.000250 | 500.125 | 10.003 |
| 4 | 10 | 40 | 50 | 20 | 15 | 27.000 | 0.000000 | 3 | 0.050000 | -5 | 0.000000 | 0.050000 | 525.000 | 10.500 |
| 5 | 300 | 150 | 75 | 250 | 500 | 255.000 | 0.000000 | 3 | 0.050000 | 250 | 1.000000 | 0.051000 | 525.500 | 10.510 |
| 6 | 300 | 150 | 75 | 250 | 1400 | 435.000 | 0.000000 | 3 | 0.050000 | 1150 | 4.600000 | 0.054600 | 527.300 | 10.546 |
| 7 | 1100 | 1000 | 1200 | 1100 | 1100 | 1100.000 | 0.100000 | 2 | 0.000000 | 0 | 0.000000 | 0.100000 | 550.000 | 11.000 |
| 8 | 1200 | 1000 | 1500 | 1000 | 2100 | 1360.000 | 0.360000 | 3 | 0.050000 | 1100 | 1.100000 | 0.411100 | 705.550 | 14.111 |
| 9 | 170 | 200 | 230 | 240 | 300 | 228.000 | 0.000000 | 5 | 0.150000 | 60 | 0.250000 | 0.150250 | 575.125 | 11.503 |
| 10 | 160 | 100 | 100 | 100 | 100 | 112.000 | 0.000000 | 1 | 0.000000 | 0 | 0.000000 | 0.000000 | 500.000 | 10.000 |
| $D_{LPM}$ | | | | | | | | | | | | | | 111.232 |

FIG. 4

| v(k,i) | 1 | 2 | 3 | 4 | 5 | a | κ | L | η | δ | Δ | ρ | D | D*w |
|---|---|---|---|---|---|---|---|---|---|---|---|---|---|---|
| 1 | 95 | 100 | 90 | 90 | 100 | 95.000 | 0.583333 | 2 | 0.000000 | 10 | 0.111111 | 0.585185 | 792.593 | 15.852 |
| 2 | 55 | 45 | 50 | 50 | 55 | 51.000 | 0.000000 | 3 | 0.050000 | 5 | 0.100000 | 0.051667 | 525.833 | 10.517 |
| 3 | 85 | 80 | 75 | 70 | 70 | 76.000 | 0.266667 | 1 | 0.000000 | 0 | 0.000000 | 0.266667 | 633.333 | 12.667 |
| 4 | 45 | 40 | 50 | 45 | 40 | 44.000 | 0.000000 | 2 | 0.000000 | -5 | 0.000000 | 0.000000 | 500.000 | 10.000 |
| 5 | 30 | 40 | 50 | 45 | 80 | 49.000 | 0.000000 | 4 | 0.100000 | 35 | 0.777778 | 0.112963 | 556.481 | 11.130 |
| 6 | 60 | 70 | 60 | 65 | 60 | 63.000 | 0.050000 | 2 | 0.000000 | -5 | 0.000000 | 0.050000 | 525.000 | 10.500 |
| 7 | 75 | 80 | 85 | 90 | 100 | 86.000 | 0.433333 | 5 | 0.150000 | 10 | 0.111111 | 0.585185 | 792.593 | 15.852 |
| 8 | 90 | 100 | 95 | 80 | 100 | 93.000 | 0.550000 | 3 | 0.050000 | 20 | 0.250000 | 0.604167 | 802.083 | 16.042 |
| 9 | 30 | 35 | 20 | 70 | 95 | 50.000 | 0.000000 | 4 | 0.100000 | 25 | 0.357143 | 0.105952 | 552.976 | 11.060 |
| 10 | 100 | 100 | 100 | 100 | 100 | 100.000 | 0.666667 | 1 | 0.000000 | 0 | 0.000000 | 0.666667 | 833.333 | 16.667 |
| $D_{OPM}$ | | | | | | | | | | | | | | 130.285 |

FIG. 5

| v(k,i) | 1 | 2 | 3 | 4 | 5 | a | κ | L | η | δ | Δ | ρ | D | D*w |
|---|---|---|---|---|---|---|---|---|---|---|---|---|---|---|
| 1 | 90 | 120 | 100 | 120 | 130 | 112.000 | 0.120000 | 3 | 0.050000 | 10 | 0.083333 | 0.170833 | 585.417 | 17.563 |
| 2 | 200 | 150 | 130 | 140 | 150 | 154.000 | 0.540000 | 3 | 0.050000 | 10 | 0.071429 | 0.590714 | 795.357 | 23.861 |
| 3 | 250 | 230 | 310 | 320 | 300 | 282.000 | 1.820000 | 3 | 0.050000 | -20 | 0.000000 | 1.870000 | 1435.000 | 43.050 |
| 4 | 150 | 170 | 80 | 100 | 100 | 120.000 | 0.200000 | 2 | 0.000000 | 0 | 0.000000 | 0.200000 | 600.000 | 18.000 |
| 5 | 150 | 150 | 150 | 150 | 150 | 150.000 | 0.500000 | 1 | 0.000000 | 0 | 0.000000 | 0.500000 | 750.000 | 22.500 |
| 6 | 80 | 85 | 90 | 95 | 100 | 90.000 | 0.000000 | 5 | 0.150000 | 5 | 0.052632 | 0.150526 | 575.263 | 17.258 |
| 7 | 100 | 105 | 103 | 110 | 100 | 103.600 | 0.036000 | 3 | 0.050000 | -10 | 0.000000 | 0.086000 | 543.000 | 16.290 |
| 8 | 150 | 170 | 130 | 140 | 150 | 148.000 | 0.480000 | 3 | 0.050000 | 10 | 0.071429 | 0.530714 | 765.357 | 22.961 |
| 9 | 80 | 90 | 70 | 60 | 100 | 80.000 | 0.000000 | 3 | 0.050000 | 40 | 0.666667 | 0.056667 | 528.333 | 15.850 |
| 10 | 150 | 155 | 160 | 155 | 170 | 158.000 | 0.580000 | 4 | 0.100000 | 15 | 0.096774 | 0.680968 | 840.484 | 25.215 |
| $D_{LRR}$ | | | | | | | | | | | | | | 222.546 |

| v(k, i) | 1 | 2 | 3 | 4 | 5 | a | κ | L | η | δ | Δ | ρ | D | D*w |
|---|---|---|---|---|---|---|---|---|---|---|---|---|---|---|
| 1 | 10 | 50 | 200 | 400 | 900 | 312.000 | 0.480000 | 1 | 0.000000 | 500 | 0.000000 | 0.480000 | 740.000 | 74.000 |

| $D_{LMR}$ |
|---|
| 74.000 |

FIG. 8

| v(k, i) | 1 | 2 | 3 | 4 | 5 | a | κ | L | η | δ | Δ | ρ | D | $D_{QDR}=$ $D*w$ |
|---|---|---|---|---|---|---|---|---|---|---|---|---|---|---|
| 1 | 0 | 500 | 1000 | 1500 | 2000 | 1000.000 | 0.000000 | 5 | 0.150000 | 500 | 0.333333 | 0.150067 | 575.033 | 115.007 |
| 2 | 1000 | 1100 | 1200 | 600 | 300 | 840.000 | 0.000000 | 3 | 0.050000 | -300 | 0.000000 | 0.050000 | 525.000 | 105.000 |
| 3 | 4000 | 4300 | 4700 | 5500 | 6500 | 5000.000 | 0.000000 | 5 | 0.150000 | 1000 | 0.181818 | 0.150036 | 575.018 | 115.004 |

RATE CONTROL TECHNIQUE FOR A LIGHTWEIGHT DIRECTORY ACCESS PROTOCOL OVER MQSERIES (LOM) SERVER

FIELD OF THE INVENTION

The invention generally relates to a system and method for a rate control technique and, in particular, to controlling rates for a Lightweight Directory Access Protocol (LDAP) over MQSeries (LoM) server.

BACKGROUND

Many organizations have implemented a Lightweight Directory Access Protocol (LDAP) for accessing and managing information directories in a network. LDAP information directories are structured as a tree hierarchy, which includes a root directory, as well as directories for divisions and/or departments within the LDAP organization. The tree hierarchy may also include information about individuals, files, shared resources, etc.

A LDAP directory can be distributed among many servers. Each server can have a replicated version of the entire LDAP directory, which may be synchronized periodically. The LDAP server can receive requests from one or more users and coordinate responses to the user. The type of requests may include requests to read, update, delete, etc., information stored on the LDAP server. The number of requests received from the LDAP server and the order in which the requests are carried out may vary between servers.

Any number of authorized or unauthorized persons may send requests to the LDAP server. The LDAP server may process all requests received or only those requests coming from persons that are authorized to make the request. Authorization may be determined based permissions, which may be set by an administrator. An administrator may also describe a schema for the LDAP, i.e., a way to describe the format and attributes of data in the LDAP server.

SUMMARY

In a first aspect of the invention, a system comprises a health metrics engine configured to calculate an actual delay value. The system also comprises at least one LoM queue configured to asynchronously obtain the actual delay value from the health metrics engine and place the delay value between one or more requests and a LDAP master configured to accept the one or more requests and send information in the one or more requests to a LDAP.

In another aspect of the invention, a computer implemented method to determine a delay value comprises obtaining metric data about at least one of an operating system performance metric, a LDAP performance metric, and an update flow metric and assigning a weight to the metric data. The method further comprises calculating one or more weighted delay values for each of the metric data, wherein the sum of the weighted values equals a calculated delay value and using the calculated delay value and a queue bias to ascertain an actual delay value. The actual delay value may be sent to a LoM server, which is configured to place the actual delay value between one or more request reads to control a processing pace of the LoM queue.

In yet another aspect of the invention, a computer program product comprising a computer usable medium having readable program code embodied in the medium is provided. The computer program product includes at least one component operable to: obtain metric data; assign a weight to the metric data; calculate a delay value using one or more known mathematical algorithms and/or techniques such as time-series analysis, moving average, linear regression, and dynamic programming; determine one or more weighted delay values for each of the metric data, wherein the one or more weighted delay values are added together to obtain the calculated delay value; ascertain an actual delay value using the calculated delay value and a queue bias; and send the actual delay value to a LoM server, wherein the actual delay is put between one or more request reads to control a processing pace of the LoM queue.

In a further aspect of the invention, a method for computing a delay value, comprises providing a computer infrastructure being operable to: obtain metric data about at least one of an operating system performance metric, a LDAP performance metric, and an update flow metric; assign a weight to the metric data; determine one or more weighted delay values for each of the metric data, wherein the one or more weighted delay values are added together to obtain the calculated delay value; multiply the calculated delay value by a queue bias to ascertain an actual delay value; and send the actual delay value to a LoM server, where the actual delay is put between one or more request reads to control a processing pace of the LoM queue.

BRIEF DESCRIPTION OF THE DRAWINGS

The present invention is described in the detailed description which follows, in reference to the noted plurality of drawings by way of non-limiting examples of exemplary embodiments of the present invention.

FIGS. 4-8 illustrate calculations that may be performed to determine input values in accordance with aspects of the invention.

DETAILED DESCRIPTION

Figure 1:
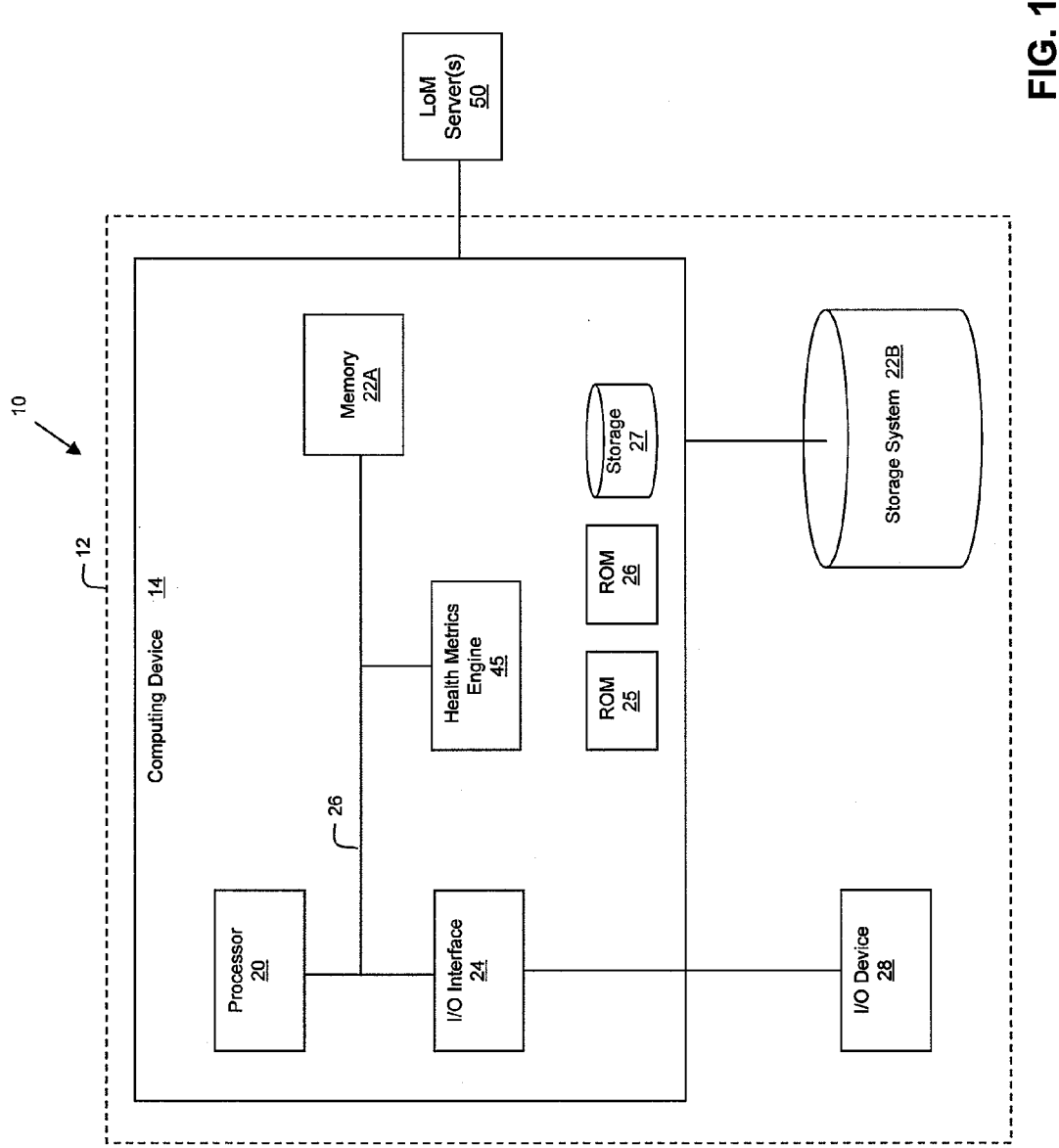
FIG. 1 shows an illustrative environment for implementing the steps in accordance with the invention.

The invention is directed to a system and method for a rate control technique and, in particular, to controlling rates for a Lightweight Directory Access Protocol (LDAP) over MQSeries (LoM) server. More specifically, the invention includes a LoM server that is configured to receive LDAP directory requests, e.g., update requests, on an MQSeries queue. Once received, the update requests can be checked to determine whether the requestor has permission, i.e., authorization, to update the information requested. If so, the LoM server applies the update to a master LDAP directory.

The LoM server is the sole application that is authorized to make updates to the LDAP master directory; therefore, it is important that the LoM server be able to process requests as fast as possible. However, when a large amount of sequential requests are rapidly received, the LDAP becomes a bottleneck and the speed at which the requests are processed diminishes.

For example, processing a rapid series of modification requests causes LDAP replicas to spend excessive time processing updates from the LDAP master. This results in the LDAP directory responding slowly to user searches and may result in user searches failing due to time out conditions. The rate control technique described herein is configured to control the rate at which changes are applied to the LDAP directory to ensure that users get timely responses to their search requests.

The rate control technique utilizes existing LDAP environment health metrics, which are obtained from the LoM server, to determine what length of a pause, if any, should be inserted between requests so as to help directory servers maintain service level agreement objectives for performance. In embodiments, the LDAP environment health metrics may be checked asynchronously or synchronously at predefined intervals. The information obtained from the LDAP environment health metrics may be used to determine whether any pacing on processing updates is needed. The length of the pacing may range from none to a full stop until the next health metric check is performed.

In embodiments, pacing can be used by an operator, administrator, etc., to alter how health metric values are converted into duration of delays between processing queued updates. For example, since updates to an LDAP directory are likely to consume the most resources, the pacing of these updates can be altered according to the availability of LDAP system resources. This allows the LDAP directory servers, i.e., replicas, to spend more time on processing requests from LDAP users, such as authentication requests, search requests, etc. Beneficially, by pacing requests to an LDAP directory, the overall LDAP directory performance increases during peak times.

A number of designs having a pacing delay may be used. For example, a delay may be placed between reads to control the LoM server's queue processing pace, thereby allowing the pace to speed up or slow down based on the overall system status. For example, if an overwhelming number of updates are sent to the LoM server, the number of updates that the LDAP master needs to process increases. This increase degrades the LDAP master's performance and causes significant increases in replication volume, which in turn forces LDAP replicas to spend more time on replication than serving LDAP clients. Moreover, this increase eventually degrades the performance of the entire system affecting LDAP users.

The use of a delay value that can be changed dynamically based on the overall system status represented by different factors/inputs minimizes the degradation of the system. The calculation of the amount of delay may be based on a number of different factors including the overall update flow within the directory system, LDAP performance, and operating system performance at a given time. The acquisition of the data required for the delay calculation, as well as the calculation itself, may be performed by a software agent such as a Health Metrics Engine (HME).

DEFINITION OF ACRONYMS

| ACRONYM | DEFINITION |
|---|---|
| a | Metrics Data Average |
| d | Default Delay Value |
| D | Computed Delay Value |
| EDRM | Enterprise Directory Resource Monitor |
| FL | Maximum Increase Amount (%) for Longest Increasing/Decreasing Subsequence |
| h | Time |
| HME | Health Metrics Engine |
| i | Time index |
| k | Component (server or queue) Index |
| n | Number of servers or queues |
| L | Length of Longest Increasing/Ascending Subsequence |

-continued
DEFINITION OF ACRONYMS

| ACRONYM | DEFINITION |
|---|---|
| LMR | LDAP Master [Change Application] Rate |
| LoM | LDAP over MQSeries |
| LPM | LDAP Performance Metrics [response time] |
| LRR | LDAP Replication Rate [replica count] |
| OPM | Operating System Performance Metrics [CPU utilization] |
| q | Queue Index |
| QB | Queue Bias |
| QDR | Queue Depth [Change] Rate |
| S | Sequence |
| s | Subsequence |
| t | Threshold value |
| UFM | Update Flow Metrics [combines LRR, LMR, and QDR] |
| v | Metrics data [server response time, CPU utilization, replica count, change application rate, or queue depth] |
| W | Weight value [%] |

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

a portable computer diskette,
a hard disk,
a random access memory (RAM),
a read-only memory (ROM),
an erasable programmable read-only memory (EPROM or Flash memory),
a portable compact disc read-only memory (CDROM), and/or
an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a Health Metrics Engine (HME) 45, which is a software agent that is configured to acquire data for calculating a delay. The data may include the overall update flow within the directory system, the LDAP performance, and the operating system's performance. The HME 45 is further configured to use the acquired data to dynamically calculate a delay, which may be placed between reads to control the processing pace of a LoM server 50.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc. The storage system 22B can include an "inventory" of sounds, modifications, etc., which may be selected by the user's avatar.

In general, the processor 20 executes computer program code, which is stored in the memory 22A, a read-only memory (ROM) 25, random access memory (RAM) 26, storage 27, and/or storage system 22B. The computer code may be representative of the functionality of the HME 45. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the processes described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Exemplary Implementation of the System

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
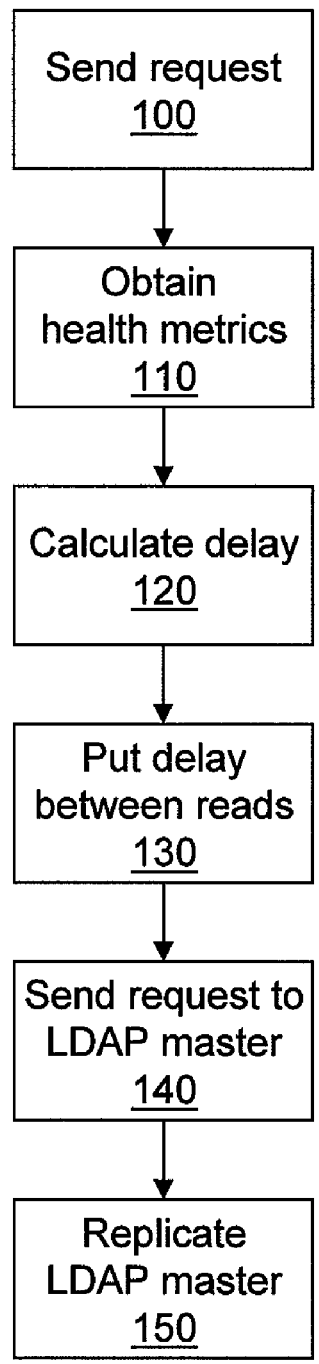
FIG. 2 shows a flow chart of an exemplary process in accordance with aspects of the invention.

FIG. 2 shows an exemplary process according to embodiments of the invention. In particular, at step 110, the HME may obtain one or more health metrics about the system. The health metrics may include OS performance metrics, LDAP performance metrics, update flow metrics, etc. The HME may also obtain one or more input metric weights for the health metrics, a queue bias, etc. The HME may use this information to calculate a queue delay, at step 120.

In embodiments, the calculated queue delay may be put between one or more requests, at step 130. One or more of the requests may be from a LoM client and may include, e.g., update requests, delete requests, add requests, etc. Once a queue delay is placed between the requests, the requests may be sent to an LDAP master at step 140. The LDAP master may process the requests and send information stored in the LDAP master to one or more LDAP replicas, at step 150.

LoM Queue Pacing Design

Traditionally, a LoM server consumes messages from a queue without any delay between reads. For example, the LoM can read a message containing an update to the directory, processes the update, and obtain the next message in the queue, if any. However, this design may result in the LoM acting as a bottleneck, which poses problems when numerous requests are in a queue. The present invention beneficially overcomes this problem by putting a delay between LoM server reads.

Putting a delay between LoM server reads beneficially controls the LoM server's queue processing pace so that the pace can be sped up or slowed down depending on the overall system status. For example, when an overwhelming number of updates are sent to the LoM server, the amount of updates the LDAP master must process increases. This degrades the LDAP master's performance, thereby causing a significant increase in replication volume. The increase forces LDAP replicas to spend more time on replication than serving LDAP clients. This eventually degrades the performance of the entire system affecting LDAP users. This degradation can be avoided by putting a delay between LoM server reads, wherein the calculation of the delay value can be changed dynamically based on the overall system status represented by different factors/inputs.

The amount of delay put between LoM server reads can be calculated based on different factors, which include the overall update flow within the directory system, LDAP performance, and operating system performance at a given time. The calculation of the delay and the acquisition of the data required for calculation can be performed by the HME, such as HME 45.

The HME is configured to obtain the performance metrics data from different sources (metrics sources). Exemplary metrics sources include LDAP performance data from an Enterprise Directory Resource Monitor (EDRM), operating system performance data from small remote software agents, and update flow rate from queue and various standard LDAP statistics.

LDAP performance metrics (LPM) may be based on the changes in the individual response time values for each LDAP replica in the cluster. Operating system performance metrics (OPM) can be based on the changes in the individual CPU utilization (in percentage) by each LDAP replica in the cluster. Update flow metrics (UFM) may be based on the changes in the "update consumption or application" rates obtained from various input/output points in the system. These input/output points may include changes in the LoM input queue depths, LDAP master change application rate, and LDAP replication rate. The impact of each rate on the delay can be weighted using a predefined percentage.

The HME is configured to implement a logic to employ LPM, OPM, and UFM in the calculation of the delay for each LoM queue. This is referred to as the "computed delay value" (D). The LoM Server may communicate with HME at certain intervals to obtain D for the queue it is processing. If the HME is unavailable, the present invention is configured to use a default delay value. The HME may repeat this process at certain intervals to recalculate the delay based on the changes in the system performance and the update flow.

Illustration of LoM Queue Pacing Design

Figure 3:
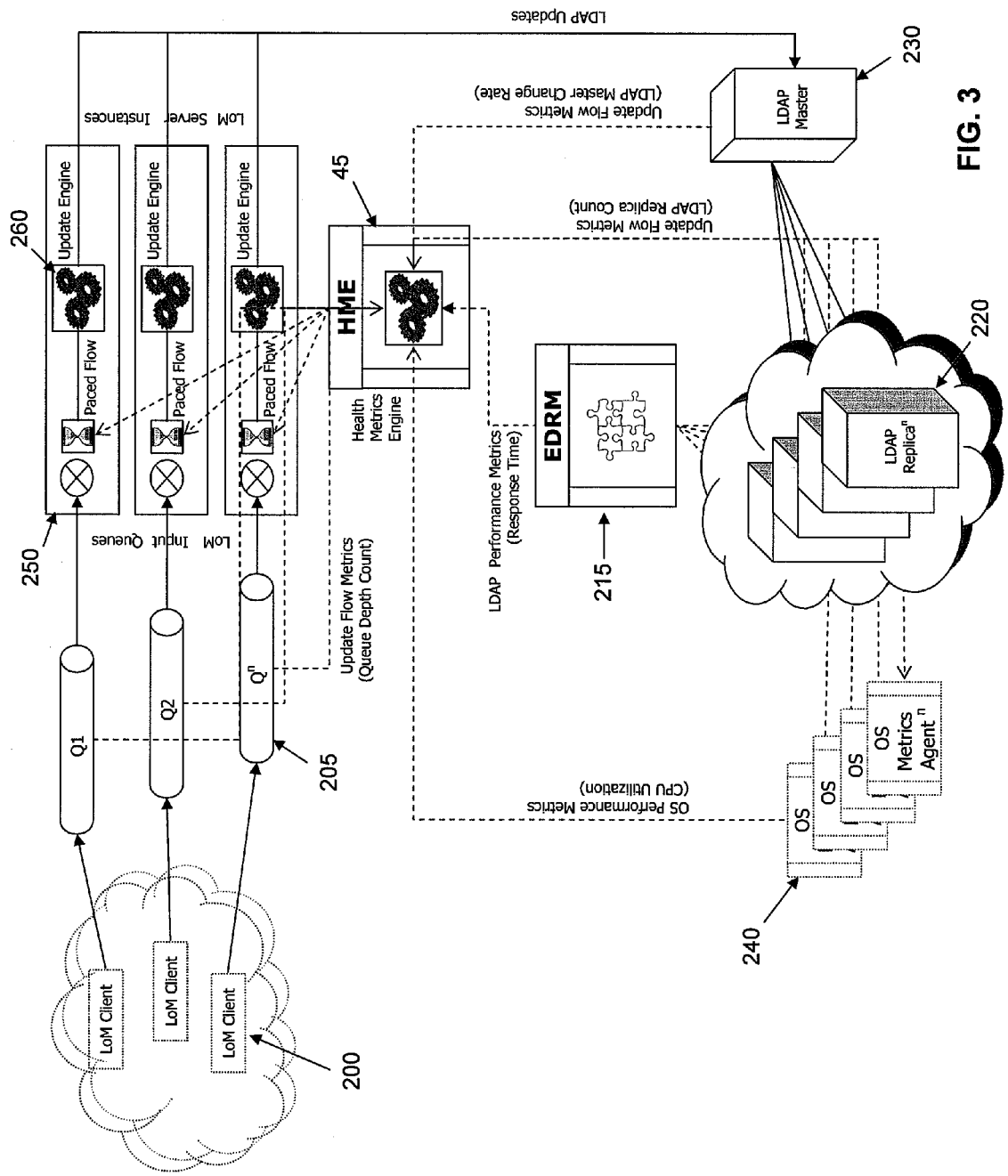
FIG. 3 shows an illustrative embodiment of a LoM queue pacing design in accordance with aspects of the invention.

FIG. 3 shows an illustrative embodiment of the LoM queue pacing design in accordance with the invention. Specifically, FIG. 3 includes one or more LoM clients 200. The LoM clients can make any number of requests, which may be received by one or more queues 205. Exemplary requests may include, e.g., requesting user password updates, user group updates, user profile updates, etc.

The queues 205 are configured to receive requests from one or more LoM clients and obtain information about the system to determine an appropriate amount of time to delay one or more of the requests. In embodiments, the queues 205 obtain information by pulling the HME 45 periodically or by pulling the HME 45 upon the occurrence of an event. The queues 205 are also configured to send update flow metrics associated with a queue depth count to the HME 45.

The HME 45 is configured to asynchronously pull information about LDAP performance metrics from an Enterprise Directory Resource Monitor (EDRM) 215 or a similar system that is structured to measure LDAP response times. The EDRM 215 in turn is configured to asynchronously accumulate replica information and LDAP response times from one or more LDAP replicas 220. It should be understood that while the EDRM 215 is illustrated in FIG. 3, embodiments may allow the HME 45 to obtain LDAP performance metrics directly from the LDAP replicas 220 without using the EDRM 215.

In embodiments, the HME 45 may be further configured to obtain update flow metrics from, such as the LDAP master's change rate, the LDAP master 230. The HME may also obtain operating system (OS) performance metrics relating to utilization of the central processing unit (CPU). In embodiments, the OS performance metrics may be obtained from an OS metrics agent 240 using a secure shell protocol (SSH), a remote shell protocol (RSH), etc. Specifically, the OS metrics agent 240 is configured to measure OS responsiveness on an LDAP server by, e.g., checking CPU utilization, verifying memory usage, etc. For example, the OS metrics agent 240 may periodically measure CPU, memory, I/O, etc., usages for the entire system and report the measurements to the HME 45. In embodiments, the OS metrics agent 240 may be a separate program running independently on a server to measure operating system related performance.

The HME 45 may also obtain one or more input metric weights relating to the LDAP performance metrics, the update flow metrics, and the OS performance metrics. In embodiments, one or more of the input metric weights may be set to default values and/or assigned by an administrator, user, etc. In addition to obtaining input metric weights, the HME 45 may also determine existing queue bias and/or calculate a queue bias. Once calculated, the queue bias may be used by the HME 45 to calculate a queue delay.

One or more LoM server instances 250 may receive requests from one or more of the queues 205 and asynchronously pull the HME 45 for the calculated queue delay. In embodiments, the calculated queue delay may be placed between reads to control the LoM server's processing pace, thereby allowing the pace to sped up or slow down based on the overall system status.

Prior to sending the requests to the LDAP master 230, embodiments may determine whether the LoM client 200 has authorization to make the request, e.g., update, delete, etc., via an update engine 260. If the LoM client 200 does not have the proper authorization, the request is not sent to the LDAP master 230. However, if the LoM client 200 has the proper authorization, the request is sent to the LDAP master 230. The LDAP master 230 is a designated LDAP server configured to replicate the request to one or more LDAP replicas 220 such that the LDAP replicas 220 include the same information as the LDAP master 230.

The features discussed in reference to FIG. 3 and the calculations used by the HME 45 to determine the queue delay are described in more detail herein.

LoM Queue Pacing Calculations

1. Default Delay Value (d) for a Queue

In embodiments, the HME uses a default delay value (d) as a pivot to produce a computed delay value (D) for each queue. If the system is functioning normally, d is the delay value for the LoM server. A system functions normally when all of the performance measurements, which includes LDAP response times, CPU utilizations, etc., are within acceptable ranges and the input/output rates are also within acceptable ranges.

If the system is not functioning normally, i.e., measurements and/or rates indicate an overall change or an isolated performance degradation within the system, d will be increased accordingly to produce the computed delay value (D). The amount of the increase is based on a number of calculations, which are described herein.

2. Manual Bias Value (QB) for a Queue

Embodiments of the invention allow for a manual intervention of D. This manual intervention may be accepted as a "bias" value for each queue (QB). The default QB for a queue is "1.0", however, the value for QB may be changed so as to instruct LoM servers to slow down or speed up requests, regardless of what the performance measurements and/or rates indicate. For example, if queue 1 (q=1) is used by a vital application and the LoM server processing the queue needs to consume at a faster rate than the rate dictated by D for the queue, a QB equal or greater than 0.0 and less than 1.0 can be used.

3. Actual Delay Value (D') for a Queue

An actual delay value (D') for a queue may be calculated by multiplying QB by D, as illustrated by the following equation:

$$D'_q = QB_q \cdot D_q \qquad (1)$$

For instance, if $D_1$ is 6 seconds and $QB_1$ is set to 0.4, $D'_1$ will be 2.4 seconds. If $QB_1$ is greater than 1.0, e.g., 2.0, $D'_1$ will be 12 seconds.

4. Weight Distributions Between Metrics Sources

Any number health metrics may be used to calculate D, which is based on d. Each metric may be associated with a predefined "weight" value, which may be represented as a percentage such that the total weight of all of the metrics involved adds up to 100%. For example, UFM may be assigned a weight of 70% ($W_{UFM}$) whereas LPM and OPM may be assigned a weight of 20% ($W_{LPM}$) and 10% ($W_{OPM}$), respectively.

The weight assigned to UFM ($W_{UFM}$) may be divided into small predefined weights by the HME to factor in the effects of queue depth change rate (QDR), LDAP Master change application rate (LMR), and LDAP replication rate (LRR). In embodiments, the division of weight may be performed based on the conceived importance of each "update" point within the system. For example, as illustrated in the table 1, $W_{UFM}$ can be associated with a weight of 60%. This weight may be distributed, e.g., as 20% for QDR ($W_{QDR}$), 10% for LMR ($W_{LMR}$), and 30% for LRR ($W_{LRR}$).

TABLE 1

| LPM $W_{LPM}=$ | OPM $W_{OPM} = 20\%$ | UFM $W_{UFM} = 60\%$ | | |
|---|---|---|---|---|
| 20% | | QDR $W_{QDR} = 20\%$ | LMR $W_{LMR} = 10\%$ | LRR $W_{LRR} = 30\%$ |

The weight associated with a metric can be used to determine the computed delay value. For example, the LDAP performance can be measured using the LDAP performance metrics (LPM). As illustrated in table 1, the impact of the changes in the LDAP performance to the computed delay value (D) is 20%. Accordingly, if LPM were the only source used to calculate the delay, its weight would be 100%. However, there are other metrics to be factored into the calculation and, as such, a weight is assigned to each metric.

Multiple update points in the system exist, therefore, UFM is comprised of metrics obtained from queues, the LDAP master, and LDAP replicas. As such, embodiments may distribute weight assigned to UFM based on the conceived importance of sources that comprise UFM. For example, in table 1, UFM's overall weight is set to 60% and is distributed among queue depth change rate (QDR), LDAP master application change rate (LMR), and LDAP replication rate (LRR) as 20%, 10%, and 30%, respectively.

When computing D, embodiments may treat each metric's source as if it is the only source within the system that can be used to determine the performance. Thus, each metric's source produces its own D, which can be multiplied by the weight assigned to the source to produce the source's "share" in D. The sum of all shares produces D.

5. Queue Depth Rates (QDR) for a Queue

Embodiments may provide an exception for computing D based on queue depth rates (QDR). This exception involves calculating D for each queue as if a queue and the queue's queue depth are the only sources factored. Thus, e.g., if there are four queues, four different D values can be calculated based on the queue depth data collected for each queue.

For purposes of non-limiting illustration, the following situation is assumed:
the default delay value (d) is set to 500 milliseconds
there are three queues in the system based on the LPM obtained and processed by the HME, d should be increased by 100 milliseconds to 600 milliseconds (D)
based on OPM, LMR, and LRR, D should be 550, 580, and 600 milliseconds, respectively.
based on QDR values for each queue, D should be 590 milliseconds for queue 1, 610 milliseconds for queue 2, and 600 milliseconds for queue 3

Based on these assumptions, and the weights specified in Table 1, the following can be deduced:

$D_1 = (600 * W_{LPM}) + (550 * W_{OPM}) + (580 * W_{LMR}) + (600 * W_{LRR}) + (590 * W_{QDR})$ $D_1 = (600 * 0.20) + (550 * 0.20) + (580 * 0.10) + (600 * 0.30) + (590 * 0.20)$ $D_1 = 120 + 110 + 58 + 180 + 118$ $D_1 = 586$ milliseconds $D_2 = (600 * W_{LPM}) + (550 * W_{OPM}) + (580 * W_{LMR}) + (600 * W_{LRR}) + (610 * W_{QDR})$ $D_2 = (600 * 0.20) + (550 * 0.20) + (580 * 0.10) + (600 * 0.30) + (610 * 0.20)$ $D_2 = 120 + 110 + 58 + 180 + 122$ $D_2 = 590$ milliseconds $D_3 = (600 * W_{LPM}) + (550 * W_{OPM}) + (580 * W_{LMR}) + (600 * W_{LRR}) + (600 * W_{QDR})$ $D_3 = (600 * 0.20) + (550 * 0.20) + (580 * 0.10) + (600 * 0.30) + (600 * 0.20)$ $D_3 = 120 + 110 + 58 + 180 + 120$ $D_3 = 588$ milliseconds As there are multiple LDAP replicas in an LDAP cluster, $W_{LRR}$ can be distributed in equal shares to factor in the individual LRRs. For example, if $W_{LRR}$ is 30% and there are ten LDAP replicas (n=10) in the cluster, the individual weight for each replica would be factored in at 3% (w). The sum of weighed rates from all replicas will produce $W_{LRR}$.

TABLE 2

| LPM $W_{LPM}=$ | OPM $W_{OPM}=$ | UFM $W_{UFM} = 60\%$ | | | | | | | | | | | |
|---|---|---|---|---|---|---|---|---|---|---|---|---|---|
| 20% | 20% | QDR | LMR | LRR $W_{LRR} = 30\%$ | | | | | | | | | |
| | | $W_{QDR} =$ 20% | $W_{LMR} =$ 10% | w = 3% | w = 3% | w = 3% | w = 3% | w = 3% | w = 3% | w = 3% | w = 3% | w = 3% | w = 3% |

Similarly, the distribution method of the assigned weight described above can also be used to factor in LPM and OPM as LPM and OPM are based on individual stimulus from LDAP replicas like LRR.

TABLE 3

| LPM $W_{LPM} = 20\%$ | | | | | | | | | | | OPM $W_{OPM} = 20\%$ | | | | | | | | | |
|---|---|---|---|---|---|---|---|---|---|---|---|---|---|---|---|---|---|---|---|---|
| w = 2% | w = 2% | W = 2% | w = 2% | w = 2% | w = 2% | w = 2% | w = 2% | w = 2% | w = 2% | w = 2% | W = 2% | w = 2% | w = 2% | w = 2% | w = 2% | w = 2% | w = 2% | w = 2% | w = 2% | w = 2% |

By further distributing the weight assigned to LPM, OPM and LRC, each LDAP replica is allowed to affect D individually at a certain level. The smaller the assigned weight values (e.g., $W_{LPM}$, $W_{OPM}$), the smaller the impact on D by an individual server. Thus, the more LDAP replicas in the equation, the smaller the impact on D.

6. Threshold Value (t)

A threshold value (t) is configured to help HME determine whether the performance depicted by metrics data should start affecting D and if so, how much. In embodiments, the threshold value can be determined separately for each metric (LPM, OPM, QDR, LMR, and LRR). The threshold value may be represented in the same unit used to describe metrics data. Moreover, in embodiments, the threshold value may be an integer, which represents, e.g., a count or length.

For example, a threshold value of 1000 milliseconds for LDAP performance metrics (LPM) may be used. Additionally, a threshold value of 60% for operating system performance metrics (OPM) based CPU utilization in percentage.

7. Computed Delay Value (D) for a Queue

The calculation of D for each component requires the implementation of mathematical methods and/or algorithms such as time-series analysis, moving averages, linear regression, and dynamic programming. Such methods/algorithms require a series of data collected for a certain period of time. In embodiments, the metrics data collected by HME can be used as an input to these methods/algorithms.

In embodiments, the HME can take three factors into account when computing the delay value (D) using the metrics data collected for a server or queue for a specified period of time. The first factor is the average of the metrics data. The second factor is the longest increasing/ascending or decreasing/descending subsequence within the metrics data. The third factor is the differences between the current metrics data and the previous metrics data, i.e., the change rate.

The first factor, the average of the metrics data collected for a server or queue, helps HME determine whether a server or queue has been performing within acceptable ranges. An "acceptable range" for a server or queue may depend on what is being collected as the metric's data. For example, if the metric's data comprises LDAP response times, the acceptable range could be expressed as "between 0 and 1000 milliseconds." The upper bound of the range may determined by a "threshold" ($t_a$) value, whereas, the lower bound may be set to zero.

An average value that exceeds the threshold value indicates that the server or queue has been performing poorly. For example, if the average of the LDAP performance metrics (LPM) data (a) collected for an individual server (k) in a certain period of time (h) is 2000 milliseconds, and the threshold is set to 1000 milliseconds, HME can deduce that the performance of that particular server is not good ($a_k > t_a$) and the default delay value (d) should be increased based on the difference between a and $t_a$. With $t_a$ set to 1000 milliseconds, an average of 2000 milliseconds indicates a 100% increase over $t_a$. This can be reflected on d, which yields a D that is equal to (d*2). The reflection of the average of the metrics data on the delay can be compared to "hitting the brakes" of a car to reduce the speed significantly.

The example below is provided for illustrative purposes. The metric's data in this example represents LDAP response times (in milliseconds) collected for a server at one-minute intervals for 10 minutes (h). The threshold ($t_a$) is set to 1000 milliseconds and the default delay (d) is set to 500 milliseconds. The metric's data sequence is denoted as "v".

v={600, 750, 700, 850, 1200, 900, 1500, 950, 1300, 1350}
a=(600+750+700+850+1200+900+1500+950+1300+1350)/10=1010
a is 1% above $t_a$. (1010−1000)/1000=1%

Upon increasing the default delay value 1%, the server's D for this data sequence v would be:

$D = d*(1+1\%) = 500*1.01 = 505$ milliseconds

The HME can collect metrics data (v) for a given component such as the LDAP master, LDAP replica, or queue, for a specified number of times (h). The HME can calculate the average value of the metrics data (a) using equation 2 below. The k value in equation 2 denotes the individual component such as, e.g., the LDAP master, LDAP replica, or queue, for which the average is being calculated. The i value denotes the time index when v has been obtained. The i value may range between 1 (the oldest) and h (the most current).

$$a^k = \frac{\sum_{i=1}^{h} v_i^k}{h} \quad (2)$$

When compared with the corresponding threshold, the value of a roughly indicates how the given component has been performing within the specified time period. HME can use this information to decide whether the performance of the component is within the acceptable range or not. If not, the HME can reflect the difference between the average value and the threshold on D.

The HME checks whether the average for LPM, OPM, QDR, and LRR, is greater than the specified threshold value. For LMR, the HME checks whether the average is less than the threshold value. This is because a higher LDAP master change application rate value indicates a faster LDAP master server. Therefore, if the average of LMR values is below the threshold, the difference between the LMR values should be reflected on the delay value. In embodiments, the HME can express the difference between a and $t_a$ as a percentage ($\lambda$) using equations 3a and 3b.

$$\lambda_{LMR}^k = 0, \text{ if } a^k \geq t_a, \lambda_{LMR}^k = \frac{|a^k - t_a|}{t_a}, \text{ if } a^k < t_a \quad (3a)$$

$$\lambda^k = 0, \text{ if } a^k \leq t_a, \lambda^k = \frac{a^k - t_a}{t_a}, \text{ if } a^k > t_a \quad (3b)$$

The amount in which the average value is greater than the threshold value, should have the most impact on D since it is an indicator of the performance calculated based on the past metrics data and their averages.

8. Determining the Longest Ascending or Descending Subsequence (L)

The length of the longest increasing/ascending or decreasing/descending subsequence (L) within the metrics data can help HME determine if a queue is starting to congest, e.g., a server is starting to perform poorly. Similarly, the length may also help HME to determine if an LDAP master is starting to apply updates at a slower rate. This is useful in case the average of the metrics data collected for a server or queue is below the average threshold ($t_a$), but there is an observable increase or decrease in the metrics numbers that may require a slight increase in D.

Given a sequence $v_1, v_2, \ldots, v_h$, L is the longest of the increasing/ascending subsequences such that for every i<j, $v_i$<$v_j$. Conversely, L is the longest of the decreasing/descending subsequences such that for every i>j, $v_i$>$v_j$. Given distinct integers, V={v[0], ..., v[N−1]} (e.g., LDAP response times, CPU utilizations, etc.), a subsequence S={$s_0, \ldots, s_m$} is said to be an ascending subsequence if $s_0$< ... <$s_m$. Similarly, a subsequence S={$s_0, \ldots, s_m$} is said to be a descending subsequence if $s_0$> ... >$s_m$. The following example provides a sequence (v) having a number of ascending subsequences (S) that can be generated from the sequence (v).

v={600, 750, 700, 850, 1200, 900, 1500, 950, 1300, 1350}
S1={600, 750}
S2={900, 950, 1300, 1350}
S3={700, 850, 1200}
S4={600, 750, 850, 1200}
S5={600, 700, 850, 1500}
S6={850, 900, 950, 1300, 1350}
S7={700, 850, 900, 1500}
S8={950, 1300, 1350}
S9={600, 750, 850, 900, 950, 1300, 1350}
S10={600, 700, 850, 900, 950, 1300, 1350}
Sn={ ... }

The longest ascending subsequences (S9 and S10) in the above sequence (v) is 7. Accordingly, the length (L) of the sequence (v) is 7. In embodiments, the length (L) can be found using dynamic programming techniques by the HME. For example, a greedy non-recursive algorithm to find increasing or decreasing subsequences and their lengths can be employed.

Once the length is determined, the length (L) can be compared to another threshold ($t_L$) value to determine whether the increase/decrease, if any, warrants an increase in D. For example, if there are 10 different metric data (h) values for a server or queue, and $t_L$ is set to 7, L within 10 values must be equal to or greater than 7 to indicate that there is an increase or a decrease and the server or the queue in question is starting to perform poorly. In such cases, the default delay value (d) can be increased based on a predefined percentage ($F_L$).

9. Determining the Predefined Percentage ($F_L$)

The predefined percentage (FL) corresponds to the maximum increase amount if and/or when L indicates a "monotonous increase or decrease" in the sequence. A sequence is monotone increasing if the next element in the sequence is always greater than the previous one. For example, {1, 3, 5, 7, 8, 10} is a monotone increasing sequence. Similarly, if the next element in the sequence is always less than the previous one, the sequence is monotone decreasing. For such sequences, L will be equal to h. If L is equal to h, d will be increased by $F_L$, i.e., the maximum increase.

If L is less than h but equal to or greater than $t_L$, $F_L$ will be decreased in equal shares based on the difference between h and $t_L$. For example, if $F_L$ is set to 24%, h is 10, and $t_L$ is 7, $F_L$ will be increased/reduced in 6% equal shares ($F'_L$) when L is equal or greater than $t_L$. So, if L is 8, $F_L$ will be reduced in half to 12%. This value, denoted by ℽ in the equations, can be reflected on d as-is, which yields a D that is equal to (d*0.12). The reflection of L on the delay can be compared to "tapping on the brakes" of a car to reduce the speed slightly.

For illustrative purposes, the following example includes metrics data that is used to represent queue depths collected for a LoM input queue at one-minute intervals for 10 (h) minutes. $F_L$ is 20%, the threshold ($t_L$) is set to 7, and the default delay (d) is set to 500 milliseconds. The value v denotes the metrics data sequence and $S_L$ denotes the longest increasing subsequence.

v={60, 75, 70, 85, 120, 90, 150, 95, 130, 135}
$S_L$={60, 75, 85, 90, 95, 130, 135}=>L=7

Since L is less than h but equal to $t_L$, $F_L$ can be reduced to (0.20/(10−7+1))=0.05=ℽ By increasing the default delay value 5%, D for v for this particular queue can be calculated as follows:

$$D = d^*(1+0.05) = 500^*1.05 = 525 \text{ milliseconds}$$

In another illustrative example, metrics data may represent a LDAP master change application rate (LMR) collected at one-minute intervals for 10 (h) minutes. $F_L$ is 10%, the threshold ($t_L$) is set to 5, and the default delay (d) is set to 500 milliseconds. Unlike other metrics data processed by HME (LPM, OPM, LRR, and QDR), when/if the metrics data for LMR demonstrate a decrease, it indicates that the LDAP master is starting to slow down. Therefore, v denotes the metrics data sequence and $S_L$ denotes the longest decreasing subsequence.

v={1100, 1000, 900, 1000, 1000, 850, 800, 700, 800, 600}
$S_L$={1100, 1000, 900, 850, 800, 700, 600}=>L=7

Since L is less than h but higher than t, $F_L$ can be reduced to (0.10/(10−7+1))=0.025=ℽ By increasing the default delay value 2.5%, D for v for this particular queue can be calculated as follows:

$$D = d^*(1+0.025) = 500^*1.025 = 512.5 \text{ milliseconds}$$

10. Calculating Metric Data Values (h) and a Fraction of the Change Rate (f) for a Queue The HME can calculate ℽ by using equation 4. In using this equation, ℽ in the example above can be calculated as 0.05 (5%).

$$F'_L = \frac{F_L}{(h-L)+1} \quad (4)$$

$$\theta = 0, \text{ if } L < t_L$$

$$\theta = (L - t_L + 1) \cdot F'_L, \text{ if } L \geq t_L$$

The HME can also utilize the change rate calculated based on the last two consecutive states of a given server or a queue (i.e., component) in the system. Although the change rate cannot be used alone to determine the actual performance of a component, a fraction of it (f) can be reflected on D. The fraction (f), shown in equation 5, can be reciprocal of the average threshold ($t_a$) set for the component. Such value can be small enough not to cause drastic changes in D if and/or when there is considerable change between the current state and the previous state of the component. It will also be large enough to increase D slightly. The reflection of the change rate on the delay can be compared to "taking foot off of the gas" of a car to slow it down.

$$f = t_a^{-1} \quad (5)$$

11. Calculating Percentage of Increase or Decrease (Δ) for a Queue

The HME will calculate the difference between the current metric data ($v_h$) and the previous metric data ($v_{h-1}$) for a given component and convert it to a percentage (Δ) if there is an increase or decrease. For LPM, OPM, QDR, and LRR, HME will check whether the change rate indicates an increase. For LMR, however, it will check whether the rate indicates a decrease. This is because a higher LDAP master change application rate value indicates a faster LDAP master server. Therefore, if the difference between the current LMR value and the previous value is a negative number, it will be reflected on the delay value. Formulas 6a-6c can be used to calculate Δ:

$$\delta^k = v_k^h - v_k^{h-1} \tag{6a}$$

$$\Delta_{LMR}^k = 0, \text{ if } \delta^k \geq 0, \Delta_{LMR}^k = \frac{|\delta^k|}{v_k^{h-1}}, \text{ if } \delta^k < 0 \tag{6b}$$

$$\Delta^k = 0, \text{ if } \delta^k \leq 0, \Delta^k = \frac{\delta^k}{v_k^{h-1}}, \text{ if } \delta^k > 0 \tag{6c}$$

12. Calculating Computed Delay Value (D) for a Queue

Based on the information herein, HME can use equations 7a and 7b to calculate D for a given server or queue:

$$\sigma^k = \lambda_k + \theta^k + (f \cdot \Delta^k) \tag{7a}$$

$$D^k = d \cdot (1 + \sigma^k) \tag{7b}$$

13. Establishing a Relationship Between the Computed Delay Value (D) and Weight Distributions Between Metrics Sources As explained above, each metrics group (e.g., LPM, OPM, UFM) may be assigned a weight value to be used when calculating overall D. Formula 8 can be used by the HME to calculate weighted delay values for each metrics group. The variable m may be used to identify the metrics group and $W_m$ may be used to denote the weight value assigned to a metrics group (e.g., $W_{LPM}$, $W_{OPM}$, $W_{QDR}$, $W_{LMR}$, $W_{LRR}$).

$$D_m = W_m \cdot \sum_{k=1}^{n} D^k \tag{8}$$

In embodiments with metrics groups, W is distributed among individual LDAP replicas such that $w = W_m/n$ may be used instead of $W_m$. This is illustrated in equations 9a-9e, wherein q identifies the queue (queue 1, 2, 3, etc.) in the equation for calculating the delay value based on queue depth rates.

$$D_{LPM} = (W_{LPM}/n) \cdot \sum_{k=1}^{n} D^k \tag{9a}$$

$$D_{OPM} = (W_{OPM}/n) \cdot \sum_{k=1}^{n} D^k \tag{9b}$$

$$D_{LRR} = (W_{LRR}/n) \cdot \sum_{k=1}^{n} D^k \tag{9c}$$

$$D_{LMR} = W_{LMR} \cdot \sum_{k=1}^{n} D^k, n = 1 \tag{9d}$$

$$D_{QDR_q} = W_{QDR} \cdot \sum_{k=1}^{n} D_q^k, n = 1 \tag{9e}$$

Using the values obtained from equations 9a-9e, the HME can use equation 10 to calculate the overall D value.

$$D_q = D_{LPM} + D_{OPM} + D_{LMC} + D_{LRC} + D_{QDR_q} \tag{10}$$

In embodiments, equation 1 can be used by the HME to multiply D with a "bias value", which can be assigned by each queue processed by a LoM Server instance to allow "manual intervention" to the calculated delay value, D. In embodiments, this will result in the actual delay value, denoted by D', for a given queue, denoted by q. The default QB for a queue, which can be set to "1.0", has no effect on D. QB can be used to instruct LoM servers to slow down or speed up regardless of what the performance measurements and/or rates indicate when consuming the updates. In embodiments, the D' value is the ultimate value communicated by the HME to a LoM server instance for a given queue in the system.

Exemplary Embodiments

The following is an illustrative example of the invention, wherein sample metrics data is provided and calculations using the equations described herein are performed. The example includes three LoM server instances in the system processing three input queues. One instance may be used for user password updates (q=1, $Q_1$), another for user groups updates (q=2, $Q_2$), and yet another for employee profile data updates (q=3, $Q_3$). The queue bias value for $Q_1$ ($QB_1$), is set to 0.7, whereas the value for $QB_2$ is set to 1.20 and the value for $QB_3$ is set to 1.0. These bias values are used to determine that the LoM's processing pace against the first queue should be 30% faster than what is indicated by the computed delay value for this particular queue. Similarly, the bias values can be used to indicate that the pace against the second queue should be 20% slower than what is indicated by the computed delay value and the pace against the third queue should not be affected.

In this example, there is one LDAP master server replicating to 10 LDAP replica server. Hence, n is 10 and the upper bound limit of k is n. The lower bound is 1. The HME continuously collects metrics data at one-minute intervals for each queue and LDAP server up to 5 minutes. Hence, h is 5. The default delay value, d, is set to 500 ms and the weights are as follow:

LDAP replica performance metrics data (LPM) is set to 20% ($W_{LPM}$)
LDAP replica OS performance metrics data (OPM) is set to 20% ($W_{OPM}$)
LDAP replication rate metrics data (LRR) is set to 30% ($W_{LRR}$)
LDAP master change application rate metrics data (LMR) is set to 10% ($W_{LMR}$)
LoM queue depth rate metrics data (QDR) is set to 20% ($W_{QDR}$)

The threshold values are set as follows:
LPM average ($t_a$) is set to 1000 milliseconds
OPM average ($t_a$) is set to 60 percent
LRR average ($t_a$) is set to 100 replication entries
LMR average ($t_a$) is set to 600 updates per unit of time
QDR averages ($t_a$) is set to 5000 queue entries
LPM longest increasing subsequence ($t_L$) is set to 3
OPM longest increasing subsequence ($t_L$) is set to 3
LRR longest increasing subsequence ($t_L$) is set to 3
LMR longest decreasing subsequence ($t_L$) is set to 3
QDR longest increasing subsequence ($t_L$) is set to 3

The chart in FIG. 4 illustrates the calculations that may be performed to determine a $D_{LPM}$ of 111.232 given the following input values:

$$n = 10, k = 1 \ldots n, h = 5, W_{LPM} = 20\%, w = W_{LPM}/n = 2\%$$

$$d = 500 \text{ ms}, t = 1000 \text{ ms}, f = t^{-1} = 0.001$$

$$t_L = 3, F_L = 15\%, F'_L = \left(\frac{0.15}{(5-3)+1}\right) = 0.050$$

The chart in FIG. 5 illustrates the calculations that may be performed to determine a $D_{OPM}$ of 130.285 given the following input values:

$$n = 10, k = 1 \ldots n, h = 5, W_{OPM} = 20\%, w = W_{OPM}/n = 2\%$$

$$d = 500 \text{ ms}, t = 60, f = t^{-1} = 0.016667$$

$$t_L = 3, F_L = 15\%, F'_L = \left(\frac{0.15}{(5-3)+1}\right) = 0.050$$

Similarly, the chart in FIG. 6 illustrates the calculations that may be performed to determine a $D_{LRR}$ of 222.546 given the following input values:

$$n = 10, k = 1 \ldots n, h = 5, W_{LRR} = 30\%, w = W_{LRR}/n = 3\%$$

$$d = 500 \text{ ms}, t = 100, f = t^{-1} = 0.01$$

$$t_L = 3, F_L = 15\%, F'_L = \left(\frac{0.15}{(5-3)+1}\right) = 0.050$$

The chart in FIG. 7 illustrates the calculations that may be performed to determine a $D_{LMR}$ of 74.000 given the following input values:

$$n = 10, k = 1 \ldots n, h = 5, W_{LMR} = 10\%, w = W_{LMR}$$

$$d = 500 \text{ ms}, t = 600, f = t^{-1} = 0.001667$$

$$t_L = 3, F_L = 15\%, F'_L = \left(\frac{0.15}{(5-3)+1}\right) = 0.050$$

Further the chart in FIG. 8 illustrates the calculations that may be performed to determine a $D_{QDR}$ of 115.007, 105.000, and 115.004, respectively, given the following input values:

$$n = 10, k = 1 \ldots n, h = 5, W_{QDR} = 20\%, w = W_{QDR}$$

$$d = 500 \text{ ms}, t = 5000, f = t^{-1} = 0.0002$$

$$t_L = 3, F_L = 15\%, F'_L = \left(\frac{0.15}{(5-3)+1}\right) = 0.050$$

Accordingly, FIGS. 4-8 provide the following information:

$$\begin{cases} D_{LPM} = 111.232 & D_{QDR}^{q=1} = 115.007 \\ D_{OPM} = 130.285 & D_{QDR}^{q=2} = 105.000 \\ D_{LRR} = 222.546 & D_{QDR}^{q=3} = 115.004 \\ D_{LMR} = 74.000 \end{cases}$$

Using this information, the HME can compute a delay D as follows:

$$\overline{D} = D_{LPM} + D_{OPM} + D_{LRR} + D_{LMR} = (111.232 + 130.285 + 222.546 + 74.000) = 538.063$$

$$D_{q=1} = \overline{D} + D_{QDR}^{q=1} = 538.063 + 115.007 = 653.070$$

$$D_{q=2} = \overline{D} + D_{QDR}^{q=2} = 538.063 + 105.000 = 643.063$$

$$D_{q=3} = \overline{D} + D_{QDR}^{q=3} = 538.063 + 115.004 = 653.066$$

Moreover, the HME can compute an actual delay value D' to put between LoM server reads as follows:

$$D'_{q=1} = D_{q=1} \cdot QB_{q=1} = (653.070 * 0.70) = 457.149 \text{ ms}$$
delay before the next poll against password queue.

$$D'_{q=2} = D_{q=2} \cdot QB_{q=2} = (643.063 * 1.20) = 771.675 \text{ ms}$$
delay before the next poll against groups data queue.

$$D'_{q=3} = D_{q=3} \cdot QB_{q=3} = (653.066 * 1.00) = 653.066 \text{ ms}$$
delay before the next poll against profile data queue.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer implemented method for determining a delay value, comprising:
    obtaining metric data about at least one of an operating system performance metric and an update flow metric;
    assigning a weight to the metric data;
    calculating one or more weighted delay values for each of the metric data, wherein the sum of the weighted values equals a calculated delay value;
    using the calculated delay value and a queue bias to ascertain an actual delay value; and
    sending the actual delay value to a Lightweight Directory Access Protocol (LDAP) over MQSeries (LoM) server, which is configured to place the actual delay value between one or more request reads to control a processing pace of the LoM queue.

2. The computer implemented method of claim 1, further comprising averaging the metric data to determine whether a server or a queue has been performing within a predefined range, wherein the predefined range is between zero and a threshold.

3. The computer implemented method of claim 1, further comprising determining a longest increase or decrease subsequence in the metric data to identify whether a queue is starting to congest.

4. The computer implemented method of claim 1, further comprising determining a change rate between the metric data and previous metric data.

5. The computer implemented method of claim 1, wherein the calculated delay value is ascertained using one or more of a time-series analysis, a moving average, a linear regression, and dynamic programming.

6. The computer implemented method of claim 1, wherein the steps of claim 1 are implemented on hardware or a combination of software and hardware.

7. The computer implemented method of claim 1, wherein the steps of claim 1 are offered by a service provider based on one of a fee and subscription basis.

8. The computer implemented method of claim 1, wherein the update flow metric comprises a queue depth rate, a LDAP master rate, and a LDAP replication rate.

9. The computer implemented method of claim 1, wherein the operating system performance metric comprises one or more changes in CPU utilization by each LDAP replica in a cluster, the CPU utilization obtained from an OS metrics agent using at least one of a secure shell protocol (SSH) and a remote shell protocol (RSH).

10. A method for deploying an application for computing a delay value, comprising:
providing a computer infrastructure that implements the steps of:
obtain metric data about an operating system performance metric and an update flow metric;
assign a weight to the metric data;
determine one or more weighted delay values for each of the metric data, wherein the one or more weighted delay values are added together to obtain the calculated delay value;
multiply the calculated delay value by a queue bias to ascertain an actual delay value; and
send the actual delay value to a Lightweight Directory Access Protocol (LDAP) over MQSeries (LoM) server, where the actual delay is put between one or more request reads to control a processing pace of the LoM queue.

* * * * *